United States Patent
Lampi et al.

[15] 3,678,276
[45] July 18, 1972

[54] INFRARED RADIOMETRIC DETECTION OF SEAL DEFECTS

[72] Inventors: Rauno A. Lampi, Westborough; Kwoh H. Hu, Wayland, both of Mass.; Richard F. Osborne, Mauldin, S.C.

[73] Assignee: The United States of America as represented by the Secretary of the Army

[22] Filed: July 1, 1971

[21] Appl. No.: 159,068

Related U.S. Application Data

[63] Continuation of Ser. No. 880,263, Nov. 26, 1969, abandoned.

[52] U.S. Cl. ..............................250/83.3 H, 53/78, 156/64
[51] Int. Cl. ............................................................G01t 1/16
[58] Field of Search...................250/83.3 H, 83.3 D; 53/167, 53/78; 156/64

[56] References Cited

UNITED STATES PATENTS 3,206,603  9/1965   Mauro ..............................250/83.3 H
3,210,546  10/1965  Perron ............................250/83.3 H Primary Examiner—James W. Lawrence
Attorney—Harry M. Saragovitz, Lawrence E. Labadini, Edward J. Kelly and Herbert Berl

[57] ABSTRACT

A rapid, non-destructive test for discovering seal defects in flexible packages wherein the package seal is passed between a narrow beam heat source and a detector sensitive to infrared energy, which detector senses variations in the radiant energy emitted from the seal, such variations resulting from a change in thermal conductivity due to the presence of voids, wrinkles, irregularities or occluded matter in the seal.

7 Claims, 7 Drawing Figures

PATENTED JUL 18 1972 3,678,276

Inventors:
Rauno A. Lampi,
Kwoh H. Hu,
Richard F. Osborne,
by: Harry M. Saragovitz,
Edward J. Kelly,
Herbert Berl &
Lawrence E. Labadini  Attorneys

INFRARED RADIOMETRIC DETECTION OF SEAL DEFECTS

This application is a continuation of Ser. No. 880,263 filed Nov. 26, 1969, and now abandoned.

The invention described herein may be manufactured, used, and licensed by or for the Government for governmental purposes without the payment to us of any royalty thereon.

This invention relates to a non-destructive test for detecting defects in flexible package seal and to apparatus for accomplishing the same and, more particularly, to a method and apparatus for detecting anomalies in the thermal radiation characteristics of seal areas which anomalies correspond to defects in the seal.

Thermally processed foods have historically been packaged in rigid containers and a high confidence level has been established with respect to the ability of such rigid packages to maintain the sterility of the contents. With advances in technology relating to flexible packaging materials, it has become possible to package foods or other items requiring thermal processing, stabilization or sterilization with flexible materials. Insofar as a high confidence level has not been established for such materials, it is highly desirable that products packaged in flexible materials be rigorously checked for freedom from defects. Defects in flexible packages can be expected to occur in either the body of the package or in the seal area. This invention is concerned with a rapid, non-destructive test for defects in the seal area which defects may or may not indicate loss of integrity in the sealed package either at the time of test or at some later time. Because of the speed with which the test may be conducted and because it is non-destructive, it can be conveniently applied to every package on a production line. This invention is applicable to any flexible package having flat, smooth-surfaced seal areas.

Flexible packages are conventionally formed by heat sealing the side edges of flexible materials together where necessary to form an open pouch and, subsequent to the filling operation heat sealing the open end to close the pouch. Defects are most likely to occur in the final seal since this is the opening through which the contents are inserted and there may result some contamination of the surfaces to be sealed together and, in addition, the stresses of sealing a bulging filled pouch are less controllable with the result that the ensuing seal is more likely to be irregular or wrinkled. Irregularities, wrinkles, voids and occluded matter are defects which may be expected to be found within the seal area. Flexible packaging materials and the techniques for accomplishing heat seals are well known to those skilled in the art and form no part of this invention.

This invention is based upon the discovery that any of the above enumerated defects when located in the seal area alters the thermal conductivity through the seal thickness at that spot. Defects which alter the flow of heat through the seal will cause variations in the thermal radiation characteristics of the side or surface of the seal away from the source of heat energy. Since almost all of the radiation emitted falls within the infrared portion of the spectrum, such radiation can be detected with an infrared radiometer. The infrared radiometer responds to the intensity of the incident radiation and generates an electrical output which is proportional to the incident radiation power or intensity. Significant deviations, therefore, in the electrical output of the radiometer when scanning a seal will indicate a change in the radiant energy and the presence of a defect in the seal at that spot as will become obvious hereinafter. It is therefore among the objects of the present invention to provide a method and apparatus to accomplish the rapid, non-destructive test of seals to detect defects within the seals.

The details and features of this invention will become apparent with the following detailed description together with the accompanying drawings in which.

Figure 1:
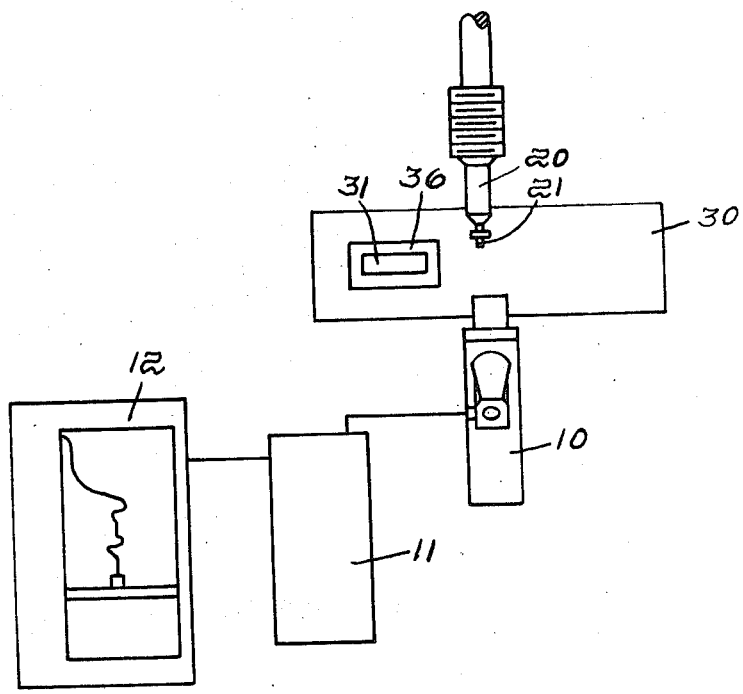
FIG. 1 is a schematic diagram of a system to accomplish the objects of the present invention.

Referring to FIG. 1, there is shown a schematic diagram of apparatus employed in the practice of the present invention, which apparatus is capable of detecting defects in the seal area of a flexible package. As shown, the three principle components of the system are a source of heat energy 20, a means 10 to measure the infrared radiant energy emitted from the surface of the seal together with associated means 11 and 12 to amplify and record or display the signal obtained, and a transport means 30 to move the flexible package in a prescribed path between the heat source and the infrared radiant energy detecting means.

The infrared radiometer means used in the present invention is a device, such as the Model RM-2B infrared radiometric microscope manufactured by Barnes Engineering Co. of Stamford, Connecticut, which consists of two parts, a microscopic 10 or optical unit containing the infrared radiation detector (not shown in the drawing) and an electronic control unit 11. Associated with the control unit is a X-Y strip chart recorder 12 that records voltage levels and variations corresponding to the radiant energy emitted along the direction of scan. The microscopic unit is a conventional infrared radiometer, having the necessary optics to focus the infrared radiation on an infrared detector. The detector, in the present example (not shown in the drawings) is a thermistor bolometer, hyperhemispherically immersed to enhance its performance. The invention is not, of course, limited to any particular type of detector since other infrared detectors such as photovoltaic detectors, thermoelectric detectors and metal bolometer detectors are equally well known infrared radiant energy detectors. Thermistor bolometers consist of thin films of semiconducting metallic oxides having high coefficients of resistance. Hyperimmersion is accomplished by placing the bolometer flake on the back of a germanium hyperhemisphere which results in an optical gain in detectability. The rated temperature resolution of this microscope is 0.5° C. on a target of unit emissivity with the instrument bandwidth set at 1 cps. With a 15x objective lens, the nominal spot size on the target at a working distance of 0.95 in. is 0.0023 in. A wider spot size can be viewed by defocusing so as to view up to a 0.25 in. diameter area without sacrificing significant sensitivity.

Radiant energy emitted by the surface area of the object under inspection is optically focused on the thermistor bolometer which provides a small voltage change for any change in radiant energy detected. Amplified electronically by the control unit 11, this voltage change is indicated on an electrometer and is recorded on the X-Y strip chart recorder 12. The Y axis records the voltage response in millivolts and the X axis corresponds to the path of the scan along the seal.

The source of heat energy may be any convenient means of directing or concentrating heat energy on a relatively small area of the surface of the seal. In FIG. 1, there is depicted a flameless torch 20 which provides a pinpoint source of heat by directing a flow of hot air through a 0.25 in. diameter nozzle 21. The air flow and temperature of the air are separately adjustable. An air flow rate of 2 cubic feet per hour is satisfactory at a heat source-to-package distance of 0.25 in. with the hot air temperature being variable from 145° to 175° C.

Figure 3:
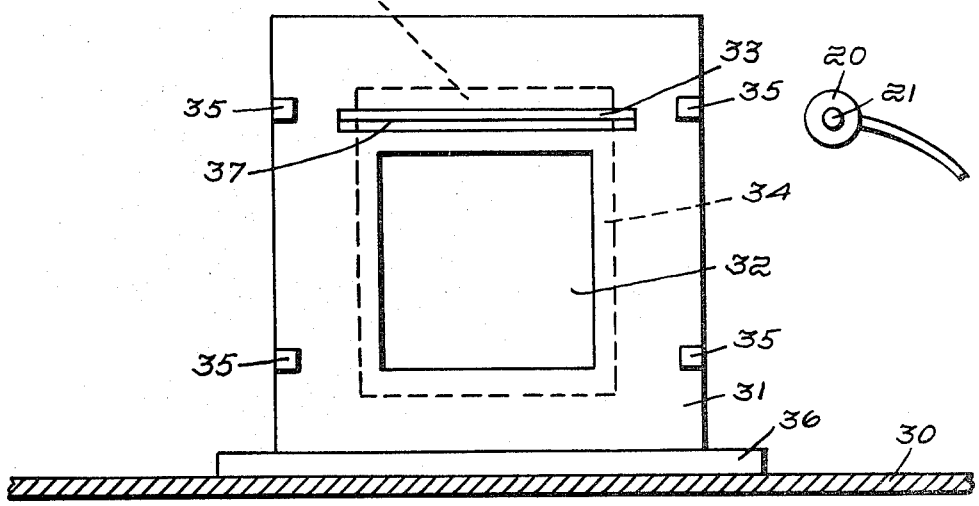
FIG. 3 is a schematic diagram of a package supported by carriage mechanism.

As shown in FIG. 3, the transport means consists of a conventional conveyor 30 together with a package holder 31 arranged so as to pass the package seal between the stationary heat source and the stationary infrared radiometric microscope at a constant speed. To create and maintain a flat seal surface, thus keeping two vital distances constant (seal-to-heat source and seal-to-microscope), a simple holder 31 is provided consisting of two plates having rectangular wells 32 in the center thereof to accommodate the filled package and having narrow slots 33 at the top which coincide to expose the closure seal. The package 34 is placed between the plates which are held together by simple clips 35. The package assembly is then mounted on a pedestal 36 which is connected to the conveyor belt.

Figure 2:
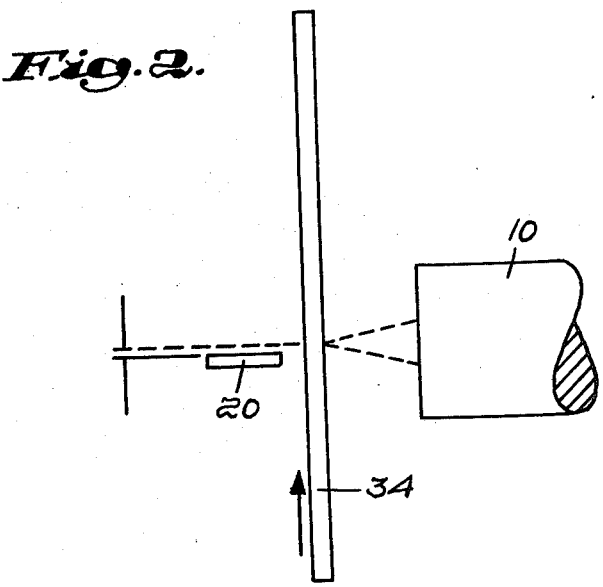
FIG. 2 is an overhead schematic drawing showing the spatial relationship of the microscope and heat source.

The flameless torch 20 (heat energy source) is positioned so as to heat one side of the exposed closure seal area as the package is moved along by the conveyor thereby scanning the length of the seal. The radiometric microscope is located on the opposite side of the package with the objective of the microscope positioned so as to scan the closure seal area on the side opposite to that heated by the heat energy source. The distance of the objective lens of the microscope to the seal is approximately 0.945 inch. The spot size viewed is 0.0028 in. in diameter and in scanning the length of the seal as it is moved along by the conveyor becomes a narrow 0.0028 in. path going the length of the seal. An advantage of the use of the infrared radiometric microscope is that no physical contact with the target is necessary; therefore, the measurement itself does not disturb the test conditions. The line of the seal scan 37 is shown in FIG. 3 and is shown to pass through a defect 38 in the seal. In FIG. 2, it can be seen that the heat source is positioned to heat the seal area slightly prior to scanning the opposite side with the microscope to give time for heat transmission through the seal area to occur. Thus the heat source leads the detector by a short distance varying from one-sixteenth to three-sixteenths in., with the shorter distance giving the best results.

Figure 4:
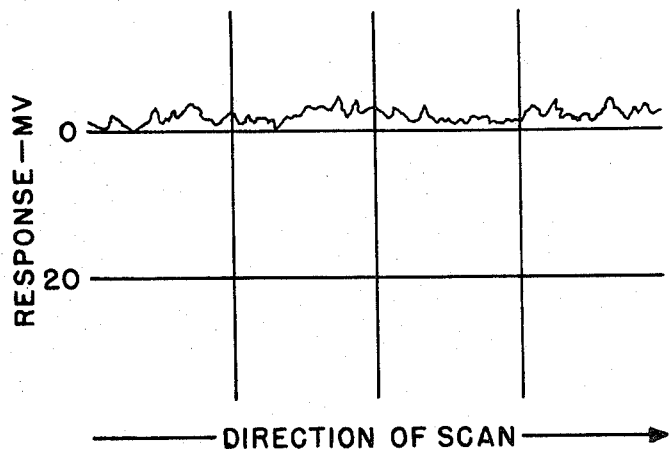
FIG. 4 is a graph of a millivolt response to an infrared radiometric scan of a seal having no defects.
Figure 5:
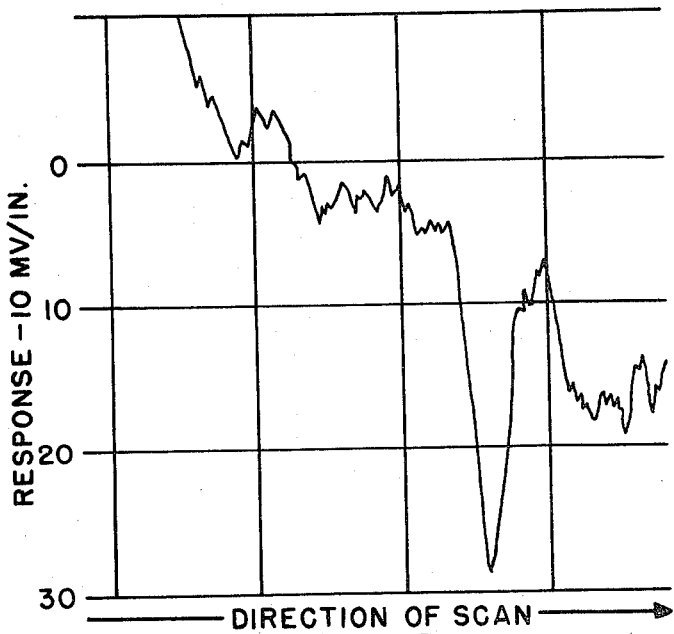
FIGS. 5 through 7 are graphs showing the millivolt response to different defects in the seal area.
Figure 6:
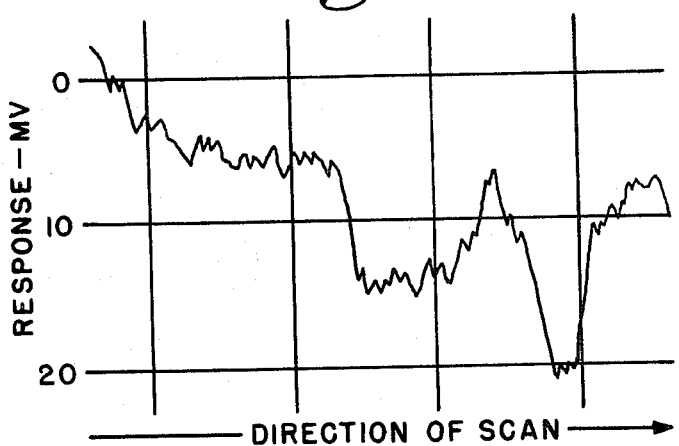
Figure 7:
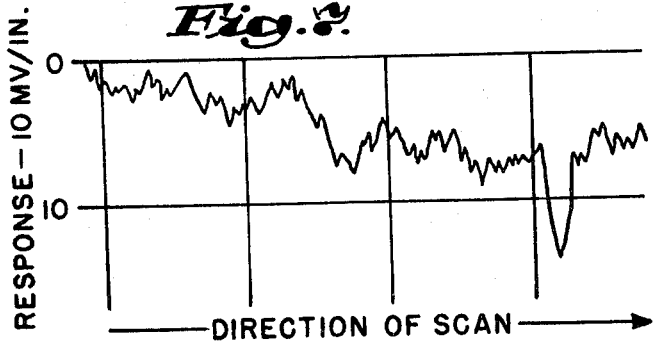

In the method of this invention, the sealed package is moved by the transport means between the stationary heat source 20 and the stationary radiometric microscope 10. The heat source causes heat to be directed against one side of the seal and to be scanned along the length of the seal as the package is passed by. Heat then flows through the seal to the opposite surface of the seal. When the heat seal is uniform in thickness, heat dissipates at a uniform rate and the radiant energy emitted and, therefore, microscope output is essentially uniform. However, if there is a void or foreign matter entrapped in the seal, the thermal impedance at that spot is different. Heat does not dissipate at the same rate, the radiant energy emitted fluctuates and there is a sharp change in the subsequent voltage output which is plotted on the strip chart recorder. Signal strength is critical to the extent that it should be significantly above and detectable from the background noise; that is, a sizeable interpretable blip. Therefore, relative signal strength is important, while absolute is not, with the result that a sudden and pronounced change in the signal indicates a problem area in the seal. In FIG. 4, there is shown a plot of the response to a closure seal having no defects. FIG. 5 shows the response curve from a scan of 3.5 mil-diameter thread in the closure seal with the peak response signaling the presence of the thread. FIGS. 6 and 7 are response curves showing respectively moisture and a 0.5 milligram potato powder in the seal area with the peaks indicating the presence of the foreign objects.

The apparatus and method of this invention are capable of detecting defects in sealed flexible packages, which defects may indicate loss of integrity of the package. Defects which may be detected are as small as 0.5 mg powder or fibers, single crystals of sugar, voids formed by withdrawing 3.5 mil threads from small areas and grease or moisture in the seal. It is to be understood that this invention is not to be limited to the exact details of construction shown and described herein for obvious modifications will occur to one skilled in the art.

We claim:

1. A method of detecting a defect present in the closure seal of a food-filled, flexible package, which comprises:
    a. placing the food-filled flexible package within a rigid package holder, said package holder having flat opposed plates bearing against and covering both sides of said closure seal to hold said seal in a flat plane, said plates having opposed narrow slots which coincide to expose a narrow portion of said closure seal along its entire length.
    b. applying heat energy at a uniform speed starting at one end and proceeding continuously to the opposite end, along the entire length of one side surface of the exposed portion of said closure seal,
    c. detecting the infrared radiant energy passing through said closure seal and emitted at the opposite side of said exposed portion of said closure seal by means of an infrared radiometric device which scans along the length of the exposed seal area at the same uniform speed at which the heat energy is applied, and
    d. moving said exposed portion of said closure seal between said heat energy source and said infrared radiometric device along a path so as to maintain a constant seal-to-heat energy distance and a seal-to-infrared radiometric device distance, whereby the presence of any defect in the exposed seal area is indicated by a change in the thermal radiation characteristics of said seal and any such anomaly in the thermal radiation characteristics is detected by the infrared radiometric device.

2. A method according to claim 1 wherein the defects present in the closure seal may be either wrinkles, voids, or occluded matter.

3. A method according to claim 2 wherein the application of said heat energy to said seal leads the actual detection on the opposite side to permit the flow of heat through said seal thickness.

4. A method according to claim 3 wherein the means to apply said heat energy and the infrared radiometric device are stationary and the package seal is moved between said means and said device causing the length of the seal to be scanned by said means and said device.

5. A method according to claim 4 wherein neither said heat energy source nor said infrared radiometric device contact the closure seal.

6. A method according to claim 5 wherein said infrared radiometric device comprises optical means which focus said transmitted infrared energy on an infrared detector.

7. A method according to claim 6 wherein said infrared detector is a hyperhemispherically immersed thermistor bolometer.

* * * * *

UNITED STATES PATENT OFFICE
CERTIFICATE OF CORRECTION

Patent No. 3,678,276              Dated   July 18, 1972

Inventor(s)  Rauno A. Lampi, Kwoh H. Hu, Richard F. Osborne

It is certified that error appears in the above-identified patent and that said Letters Patent are hereby corrected as shown below:

On the front page of the patent, in connection with data element 73, add the following --is the assignee of Rauno A. Lampi and Kwoh H. Hu--.

Signed and sealed this 3rd day of April 1973.

(SEAL)
Attest:

EDWARD M. FLETCHER, JR.           ROBERT GOTTSCHALK
Attesting Officer                 Commissioner of Patents